United States Patent
Rediger et al.

(10) Patent No.: US 10,066,154 B2
(45) Date of Patent: Sep. 4, 2018

(54) COATED PROPPANTS CONTAINING A CURED RESIN AND METHODS FOR MAKING AND USING SAME

(71) Applicant: Georgia-Pacific Chemicals LLC, Atlanta, GA (US)

(72) Inventors: Richard A. Rediger, Conyers, GA (US); Jason M. Bothwell, Atlanta, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 76 days.

(21) Appl. No.: 15/094,476

(22) Filed: Apr. 8, 2016

(65) Prior Publication Data
US 2016/0298027 A1    Oct. 13, 2016

Related U.S. Application Data

(60) Provisional application No. 62/146,226, filed on Apr. 10, 2015, provisional application No. 62/146,229, filed on Apr. 10, 2015.

(51) Int. Cl.
*C09K 8/80*    (2006.01)

(52) U.S. Cl.
CPC .................. *C09K 8/805* (2013.01)

(58) Field of Classification Search
CPC .................. C09K 8/805; C09K 8/62
See application file for complete search history.

(56) References Cited

U.S. PATENT DOCUMENTS

| | | | | |
|---|---|---|---|---|
| 3,870,666 | A | * 3/1975 | Becker | C08G 59/54 523/404 |
| 2007/0215354 | A1 | * 9/2007 | Rickman | C09K 8/64 166/295 |
| 2012/0295114 | A1 | * 11/2012 | Rediger | B22C 1/2246 428/404 |
| 2013/0065800 | A1 | * 3/2013 | McDaniel | C09K 8/805 507/219 |
| 2013/0112409 | A1 | 5/2013 | Baleno et al. | |

* cited by examiner

*Primary Examiner* — Frances Tischler
(74) *Attorney, Agent, or Firm* — Ram W. Sabnis

(57) ABSTRACT

Coated proppants can include a plurality of particles and one or more cured resin at least partially encasing or coating each of the particles. The cured resin, prior to curing, can be or include one or more treated aldehyde-based resins that can include one or more aldehyde-based resins and one or more polyamines. The polyamine can be or include one or more aromatic polyamines, one or more poly($C_2$-$C_5$ alkylene) polyamines, or a mixture thereof. The coated proppant can have a dry crush strength of about 0.1 wt % to about 3 wt % at a pressure of about 55.2 MPa, based on the Proppant Crush Resistance Test Procedure under ISO 13503-2:2011.

20 Claims, No Drawings

COATED PROPPANTS CONTAINING A CURED RESIN AND METHODS FOR MAKING AND USING SAME

CROSS-REFERENCE TO RELATED APPLICATIONS

This application claims priority to U.S. Provisional Patent Application No. 62/146,226, filed on Apr. 10, 2015, and U.S. Provisional Patent Application No. 62/146,229, filed on Apr. 10, 2015, which are both incorporated by reference herein.

BACKGROUND

1. Field

Embodiments described generally relate to proppants and methods for making and using same. More particularly, the embodiments relate to coated proppants containing a cured resin and methods for making and using same.

2. Description of the Related Art

The production of oil, natural gas, and other fluids from a subterranean formation can be enhanced by hydraulic fracturing. In general, hydraulic fracturing involves the injection of a fracturing fluid through a well bore and against the face of the subterranean formation to initiate new fractures and/or extend existing fractures in the subterranean formation. The fracturing fluid must be injected at a pressure and a flow rate great enough to overcome the overburden pressure, as well as to drive the fracturing of the subterranean formation.

The fracturing fluid usually contains a proppant, such as sand or gravel, which is carried into the fractures. The proppant particles become lodged in the fractures where the particles minimize or eliminate fracture reduction or closure upon reduced downhole pressures due to the removal of downhole fluids and/or a cessation in the introduction of the fracturing fluid thereto. The proppant filled fractures provide permeable channels through which the downhole fluids flow to the well bore and thereafter are withdrawn for production.

The high closure stresses applied to the proppant particles lodged in a fracture can fragment and disintegrate the proppant when the dry crush strength of the proppant is too low for the particular environment of the fracture. For example, a closure pressure of about 34.5 MPa (about 5,000 psi) or greater can disintegrate frac sand traditionally used as a proppant. The resulting fines from the crushed proppant can migrate and plug the interstitial flow passages in the remaining proppant filled fractures. These migratory fines drastically reduce the permeability of the propped fractures and therefore reduce or cease fluid production from such clogged fractures.

There is a need, therefore, for improved coated proppants that have a dry crush strength greater than traditional proppants and methods for making and using same.

SUMMARY

Coated proppants containing a cured resin and methods for making and using same are provided. In one or more examples, each coated proppant can include one or more particles and one or more cured resins at least partially encasing or coating each of the particles. Prior to curing, the resin can be or include one or more treated aldehyde-based resins that can include one or more aldehyde-based resins and one or more polyamines. The polyamine can be or include one or more aromatic polyamines, one or more poly($C_2$-$C_5$ alkylene) polyamines, or a mixture thereof. The coated proppant can have a dry crush strength of about 0.1 wt % to about 3 wt % at a pressure of about 55.2 MPa, based on the Proppant Crush Resistance Test Procedure under ISO 13503-2:2011.

In some examples, the coated proppants can be made or produced by the following method. The one or more aldehyde-based resins and the one or more polyamines can be reacted to produce the treated aldehyde-based resin. A plurality of particles can be at least partially coated with the treated aldehyde-based resin and one or more cross-linkers. The treated aldehyde-based resin and the cross-linker can be reacted to produce a cured resin. The cured resin can at least partially encase or coat each of the particles and can be or include one or more reaction products of the treated aldehyde-based resin and the cross-linker.

In other examples, subterranean formations can be treated. A fluid containing a plurality of the coated proppants can be introduced into a wellbore. The plurality of coated proppants can also be introduced into the subterranean formation via the wellbore. Each coated proppant can include a particle and a cured resin at least partially encasing or coating the particle. The cured resin can be or include one or more reaction products of the treated aldehyde-based resin and the cross-linker. The treated aldehyde-based resin can include one or more reaction products from a reaction between one or more aldehyde-based resins and one or more polyamines.

DETAILED DESCRIPTION

One or more aldehyde-based resins and one or more polyamines can be mixed, blended, or otherwise combined with one another and reacted to produce a treated aldehyde-based resin. The polyamine can be or include one or more aromatic polyamines, one or more poly($C_2$-$C_5$ alkylene) polyamines, or any mixture thereof. A plurality of particles can be at least partially coated with the treated aldehyde-based resin and one or more cross-linkers. The treated aldehyde-based resin and the cross-linker can be reacted to produce a cured resin at least partially encasing or coating each of the particles to form a plurality of coated proppants. It has been surprisingly and unexpectedly discovered that the coated proppants can have a dry crush strength of about 0.1 wt % to about 3 wt % or about 0.2 wt % to about 2.5 wt % at a pressure of about 55.2 MPa (about 8,000 psi), as measured according to the Proppant Crush Resistance Test Procedure under ISO 13503-2:2011.

The treated aldehyde-based resin can have increased cured strength and toughness compared to an untreated resin, i.e., the same aldehyde-based resin without the one or more polyamines mixed, blended, combined, and/or reacted therewith. The treated aldehyde-based resin can be made or otherwise produced by a variety of processes. The aldehyde-based resin and the polyamine, when added, mixed, or otherwise combined with one another to produce the treated aldehyde-based resin, can independently be in a solid state, a molten state, a liquid state (e.g., liquids, solutions, suspensions, emulsions, flocculations, or in one or multiple phases), or any combination thereof. In some examples, the polyamine in a solid state can be added to or combined with the aldehyde-based resin in a solid or molten state. In other examples, the polyamine in a liquid state can be added to or combined with the aldehyde-based resin in a molten state. In other examples, the polyamine in a solid or liquid state can be added to or combined with a reaction mixture that includes the aldehyde-based resin. In other examples, the polyamine in a solid or liquid state can be added to or combined with a mixture that includes the aldehyde-based resin in a solid or molten state and the plurality of particles.

In a first process, the polyamine can be added, mixed, or otherwise combined with a reaction mixture that includes the aldehyde-based resin. For example, the polyamine can be added to or combined with the reaction mixture of phenol and formaldehyde that has formed the aldehyde-based resin. The polyamine can further react with the aldehyde-based resin to produce the treated aldehyde-based resin. In a second process, the polyamine can be added, mixed, or otherwise combined with the aldehyde-based resin that is in a molten state. For example, the polyamine can be added to or combined with the molten aldehyde-based resin and the mixture can be agitated and cooled to produce the treated aldehyde-based resin. In a third process, the polyamine can be added, mixed, or otherwise combined with the aldehyde-based resin, the plurality of particles, and optionally a cross-linker to produce the plurality of coated proppants having the cured resin. For example, the polyamine can be added to or combined with the aldehyde-based resin, the plurality of particles, and optionally a cross-linker to produce the plurality of coated proppants having the cured resin. In any of these processes, the aldehyde-based resin can be added, mixed, or otherwise combined with the polyamine.

In the first process for making treated aldehyde-based resins, the polyamine can be added to or combined with a reaction mixture that includes the aldehyde-based resin. In the following processes, phenol-formaldehyde is discussed and described as the aldehyde-based resin and the treated aldehyde-based resin, but other aldehyde-based resins can also be made and treated by the same processes. In at least one example, the aldehyde-based resin can be urea-formaldehyde resin. In one or more examples, formaldehyde and phenol can be mixed or otherwise combined to produce a first mixture. For example, formaldehyde can be added to or combined with phenol and agitated to produce the first mixture. The first mixture can be heated to produce an aldehyde-based resin. For example, the first mixture can be heated to a temperature of about 35° C., about 40° C., about 50° C., or about 60° C. to about 65° C., about 70° C., about 75° C., about 80° C., about 85° C., about 90° C., about 95° C., about 100° C., or about 105° C. to produce the aldehyde-based resin. In another example, the first mixture can be heated to a temperature of about 35° C. to about 105° C., about 50° C. to about 100° C., about 60° C. to about 100° C., about 70° C. to about 100° C., about 50° C. to about 90° C., about 60° C. to about 90° C., about 70° C. to about 90° C., about 50° C. to about 90° C., about 60° C. to about 85° C., about 70° C. to about 85° C., or about 80° C. to about 85° C. to produce the aldehyde-based resin.

The first mixture can be heated for about 0.1 hr, about 0.5 hr, about 0.8 hr, about 1 hr, or about 1.5 hr to about 2 hr, about 2.5 hr, about 3 hr, about 4 hr, about 5 hr, or about 6 hr to produce the aldehyde-based resin. For example, the first mixture can be heated for about 0.1 hr to about 6 hr, about 0.5 hr to about 5 hr, about 1 hr to about 4 hr, about 1 hr to about 3 hr, or about 2 hr to about 3 hr to produce the aldehyde-based resin. The first mixture can be maintained under an inert atmosphere, such as an atmosphere containing one or more inert gases and/or under vacuum to produce the aldehyde-based resin. For example, one or more gases containing nitrogen ($N_2$), argon, or other inert gas sufficiently non-reactive to the first mixture can be flowed over and/or through the first mixture. In one specific example, the first mixture can be maintained under a nitrogen gas and heated to a temperature of about 60° C. to about 100° C. or about 80° C. to about 90° C. for about 2 hr to about 3 hr to produce the aldehyde-based resin.

One or more polyamines and the aldehyde-based resin can be mixed or otherwise combined to produce a second mixture. For example, the polyamine can be added to or combined with the aldehyde-based resin and agitated to produce the second mixture. The second mixture can be heated to produce the treated aldehyde-based resin. For example, the second mixture can be heated to a temperature of about 100° C., about 110° C., or about 120° C. to about 125° C., about 130° C., about 140° C., about 150° C., about 160° C., about 170° C., about 180° C., about 190° C., about 200° C., about 210° C., about 220° C., or greater to produce the treated aldehyde-based resin. In another example, the second mixture can be heated to a temperature of about 100° C. to about 220° C., about 110° C. to about 220° C., about 110° C. to about 200° C., about 120° C. to about 200° C., about 120° C. to about 180° C., about 130° C. to about 180° C., about 140° C. to about 180° C., about 150° C. to about 180° C., about 155° C. to about 170° C., about 160° C. to about 180° C., about 170° C. to about 180° C., or about 160° C. to about 170° C. to produce the treated aldehyde-based resin.

The second mixture can be heated for about 1 min, about 5 min, about 10 min, or about 15 min to about 20 min, about 30 min, about 45 min, about 1 hr, about 1.5 hr, about 2 hr, or about 3 hr to produce the treated aldehyde-based resin. For example, the second mixture can be heated for about 1 min to about 3 hr, about 5 min to about 2 hr, about 5 min to about 1 hr, about 10 min to about 1 hr, about 10 min to about 45 min, about 10 min to about 30 min, about 20 min to about 1 hr, about 20 min to about 45 min, or about 20 min to about 30 min to produce the treated aldehyde-based resin.

The second mixture can be maintained under an inert atmosphere while heated to produce the treated aldehyde-based resin, such as an atmosphere containing one or more inert gases and/or under vacuum. For example, one or more gases containing nitrogen ($N_2$), argon, or other inert gas sufficiently non-reactive to the second mixture can be flowed over, through, and/or otherwise about the second mixture. In one specific example, the second mixture can be maintained under an atmosphere of nitrogen gas, e.g., at least 99 mol % nitrogen gas, and heated to a temperature of about 140° C. to about 180° C. or about 155° C. to about 170° C. for about 0.1 hr to about 1 hr or about 0.25 hr to about 0.75 hr to produce the treated aldehyde-based resin.

In some examples of the first process, the polyamine can be combined with the aldehyde-based resin in an amount of about 0.1 wt % to about 1.5 wt %, based on a solids weight of the aldehyde-based resin. For example, the polyamine can be combined with the aldehyde-based resin in an amount of about 0.05 wt % to about 2 wt %, about 0.1 wt % to about 1.5 wt %, about 0.15 wt % to about 1 wt %, about 0.2 wt % to about 0.8 wt %, about 0.2 wt % to about 0.6 wt %, about 0.2 wt % to about 0.4 wt %, about 0.4 wt % to about 0.8 wt %, or about 0.4 wt % to about 0.6 wt %, based on a solids weight of the aldehyde-based resin.

In the second process for making treated aldehyde-based resins, one or more solid aldehyde-based resins (e.g., phenol-formaldehyde resins having a solid state) can be used as starting materials. The one or more solid aldehyde-based resins can be heated to produce a molten aldehyde-based resin. The solid aldehyde-based resins can be heated to a temperature of about 100° C., about 105° C., about 110° C., or about 115° C. to about 120° C., about 125° C., about 130° C., about 135° C., about 137° C., about 139° C., about 140° C., about 150° C., about 160° C., about 170° C., about 180°

C., about 190° C., about 200° C., or greater to produce the molten aldehyde-based resin. For example, the aldehyde-based resins can be heated to a temperature of about 100° C. to about 200° C., about 110° C. to about 200° C., about 105° C. to about 180° C., about 110° C. to about 180° C., about 110° C. to about 170° C., about 110° C. to about 160° C., about 110° C. to about 150° C., about 110° C. to about 145° C., about 110° C. to about 140° C., about 120° C. to about 180° C., about 120° C. to about 170° C., about 120° C. to about 160° C., about 120° C. to about 150° C., about 120° C. to about 145° C., about 120° C. to about 140° C., about 130° C. to about 180° C., about 130° C. to about 170° C., about 130° C. to about 160° C., about 130° C. to about 150° C., about 130° C. to about 145° C., about 130° C. to about 140° C., or about 135° C. to about 140° C. to produce the molten aldehyde-based resin.

The aldehyde-based resins can be heated for about 1 min, about 2 min, about 3 min, about 5 min, or about 8 min to about 10 min, about 15 min, about 20 min, about 30 min, about 40 min, about 50 min, about 1 hr, about 1.5 hr, or about 2 hr to produce the molten aldehyde-based resin. For example, the solid aldehyde-based resins can be heated for about 1 min to about 2 hr, about 2 min to about 1 hr, about 5 min to about 30 min, about 5 min to about 20 min, about 5 min to about 15 min, about 10 min to about 30 min, about 10 min to about 20 min, or about 10 min to about 15 min to produce the molten aldehyde-based resin.

The aldehyde-based resin can be maintained under an inert atmosphere while heated to produce the molten aldehyde-based resin, such as an atmosphere containing one or more inert gases and/or under vacuum. For example, one or more gases containing nitrogen ($N_2$), argon, or other inert gas sufficiently non-reactive to the solid or molten aldehyde-based resins can be flowed over and/or through the solid aldehyde-based resins. In one specific example, the solid aldehyde-based resins can be maintained under a nitrogen gas, e.g., at least 99 mol % nitrogen gas, and heated to a temperature of about 60° C. to about 100° C. or about 80° C. to about 85° C. for about 2 hr to about 3 hr to produce the molten aldehyde-based resin.

The one or more polyamines and the molten aldehyde-based resin can be mixed or otherwise combined to produce a molten mixture. For example, the polyamine can be added to or combined with the molten aldehyde-based resin and agitated to produce the molten mixture. Thereafter, the molten mixture can be heated for a period of time to produce the treated aldehyde-based resin. Subsequently, the treated aldehyde-based resin can be cooled to produce a solidified treated aldehyde-based resin. In one example, the polyamine can be mixed with the aldehyde-based resin under the inert atmosphere. In another example, the polyamine can be mixed with the aldehyde-based resin in air.

The molten mixture can be heated to a temperature of about 100° C., about 105° C., about 110° C., or about 115° C. to about 120° C., about 125° C., about 130° C., about 135° C., about 137° C., about 139° C., about 140° C., about 150° C., about 160° C., about 170° C., about 180° C., about 190° C., about 200° C., or greater to produce the treated aldehyde-based resin. For example, the molten mixture can be heated to a temperature of about 100° C. to about 200° C., about 110° C. to about 200° C., about 105° C. to about 180° C., about 110° C. to about 180° C., about 110° C. to about 170° C., about 110° C. to about 160° C., about 110° C. to about 150° C., about 110° C. to about 145° C., about 110° C. to about 140° C., about 120° C. to about 180° C., about 120° C. to about 170° C., about 120° C. to about 160° C., about 120° C. to about 150° C., about 120° C. to about 145° C., about 120° C. to about 140° C., about 130° C. to about 180° C., about 130° C. to about 170° C., about 130° C. to about 160° C., about 130° C. to about 150° C., about 130° C. to about 145° C., about 130° C. to about 140° C., about 135° C. to about 140° C., or about 135° C. to about 145° C. to produce the treated aldehyde-based resin.

The molten mixture can be heated for about 1 min, about 5 min, about 10 min, or about 15 min to about 20 min, about 30 min, about 45 min, about 1 hr, about 1.5 hr, about 2 hr, or about 3 hr to produce the treated aldehyde-based resin. For example, the molten mixture can be heated for about 1 min to about 3 hr, about 5 min to about 2 hr, about 5 min to about 1 hr, about 10 min to about 1 hr, about 10 min to about 45 min, about 10 min to about 30 min, about 20 min to about 1 hr, about 20 min to about 45 min, or about 20 min to about 30 min to produce the treated aldehyde-based resin.

In the second process, the polyamine can be combined with the aldehyde-based resin in an amount of about 1 wt %, about 2 wt %, about 3 wt %, or about 4 wt % to about 5 wt %, about 6 wt %, about 8 wt %, or about 10 wt %, based on a solids weight of the aldehyde-based resin. For example, in the second process, the polyamine can be combined with the aldehyde-based resin in an amount of about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 6 wt %, about 3 wt % to about 5 wt %, or about 3 wt % to about 4 wt %, based on a solids weight of the aldehyde-based resin.

The molten novolac resin, the second mixture, or the molten mixture that can include the treated aldehyde-based resin can be cooled to a temperature sufficiently low enough to produce the solidified treated aldehyde-based resin, such as a temperature of less than 50° C. or an ambient temperature (e.g., about 23° C.). The molten novolac resin, the second mixture, or the molten mixture can be cooled to about 20° C., about 22° C., about 23° C., about 24° C., or about 25° C. to about 26° C., about 28° C., about 30° C., about 35° C., about 40° C., about 45° C., or about 50° C. to produce the solidified treated aldehyde-based resin. In some examples, the molten novolac resin, the second mixture, or the molten mixture can be cooled to about 20° C., about 22° C., about 23° C., about 24° C., or about 25° C. to less than 28° C., less than 30° C., less than 35° C., less than 40° C., less than 45° C., or less than 50° C. to produce the solidified treated aldehyde-based resin. For example, the molten novolac resin, the second mixture, or the molten mixture can be cooled to about 20° C. to about 30° C., about 22° C. to about 27° C., or about 23° C. to about 25° C. to produce the solidified treated aldehyde-based resin.

The treated aldehyde-based resin made by the first, second, or third processes, or any other processes described herein, can include a varied amount of the polyamine. The treated aldehyde-based resin can include the polyamine in an amount of about 0.05 wt %, about 0.1 wt %, or about 0.15 wt % to about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, about 10 wt %, or greater, based on a solids weight of the aldehyde-based resin. For example, the treated aldehyde-based resin can include the polyamine in an amount of about 0.05 wt % to about 10 wt %, about 0.05 wt % to about 2 wt %, about 0.1 wt % to about 1.5 wt %, about 0.15 wt % to about 1 wt %, about 0.2 wt % to about 0.8 wt %, about 0.2 wt % to about 0.6 wt %, about 0.2 wt % to about 0.4 wt %, about 0.4 wt % to about 0.8 wt %, or about 0.4 wt % to about 0.6 wt %, based on a solids weight of the aldehyde-based resin. In other examples, the treated aldehyde-based resin can include the polyamine in an amount of about 0.1 wt % to about 10 wt %, about 0.5 wt % to about 10 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 6 wt %, about 3 wt % to about 5 wt %, or about 3 wt % to about 4 wt %, based on a solids weight of the aldehyde-based resin.

The polyamine can be or include one or more aromatic diamines, one or more aromatic triamines, one or more cycloaliphatic diamines, one or more cycloaliphatic triamines, one or more dialkylenetriamines, one or more trialkylenetetraamines, or any mixture thereof. Illustrative aromatic diamines can be or include, but are not limited to, 1,2-diaminobenzene (also known as o-diaminobenzene (o-DAB) or o-phenylenediamine (OPD)); 1,3-diaminobenzene (also known as m-diaminobenzene (m-DAB) or m-phenylenediamine (MPD)); 1,4-diaminobenzene (also known as p-diaminobenzene (p-DAB) or p-phenylenediamine (PPD)); 2,4'-diaminodiphenyl ether (2,4'-ODA); 3,4'-diaminodiphenyl ether (3,4'-ODA); 4,4'-diaminodiphenyl ether (4,4'-ODA); 1,2-xylylenediamine (also known as o-xylylenediamine (OXDA)); 1,3-xylylenediamine (also known as m-xylylenediamine (MXDA)); 1,4-xylylenediamine (also known as p-xylylenediamine (PXDA)); isomers thereof; salts thereof; complexes thereof; adducts thereof; or any mixture thereof. Illustrative cycloaliphatic diamines can be or include, but are not limited to, isophoronediamine (also known as 5-amino-(1-aminomethyl)-1,3,3-trimethylcyclohexane); 1,3-cyclohexanebis(methylamine) (1,3-BAMC); 1,4-cyclohexanebis(methylamine) (1,4-BAMC); 4,4-diaminodicyclohexylmethane (PACM); bis(4-amino-3-methylcyclohexyl)methane; isomers thereof; salts thereof; complexes thereof; adducts thereof; or any mixture thereof.

The polyamine can be or include one or more poly($C_2$-$C_5$ alkylene) polyamines that can include, but are not limited to dialkylenetriamines, trialkylenetetraamines, tetraalkylenepentaamines, or other polyalkylene polyamines. Illustrative poly($C_2$-$C_5$ alkylene) polyamines that are dialkylenetriamines can be or include diethylenetriamine (DETA), dipropylenetriamine, dibutylenetriamine, an isomer thereof, a salt thereof, a complex thereof, an adduct thereof, or any mixture thereof. Other illustrative poly($C_2$-$C_5$ alkylene) polyamines can be or include, but are not limited to, triethylenetetramine (TETA), tetraethylenepentamine (TEPA), pentaethylenehexamine (PEHA), dipropylenetriamine, tripropylenetetramine, tetrapropylenepentamine, pentapropylenehexamine, dibutylenetriamine, tributylenetetramine, tetrabutylenepentamine, pentabutylenehexamine, aminoethylpiperazine, dipropylenetriamine, an isomer thereof, a salt thereof, a complex thereof, an adduct thereof, or any mixture thereof. In some specific examples, the polyamine can be or include one or more dimethylenetriamine, trimethylenetetramine, tetramethylenepentamine, or pentamethylenehexamine.

As noted above, the aldehyde-based resins discussed and described herein can be or include a variety of aldehyde-based resins that can be used to make the treated aldehyde-based resins. Illustrative aldehyde-based resins can be or include, but are not limited to, one or more urea-formaldehyde (UF) resins, one or more phenol-formaldehyde (PF) resins, one or more melamine-formaldehyde (MF) resins, one or more resorcinol-formaldehyde (RF) resins or any mixture thereof. The aldehyde-based resins can be or include combinations of amino-aldehyde copolymers can include, for example, melamine-urea-formaldehyde (MUF) resins, phenol-urea-formaldehyde (PUF) resins, phenol-melamine-formaldehyde (PMF) resins, phenol-resorcinol-formaldehyde (PRF) resins, copolymers thereof, salts thereof, or derivatives thereof. In some examples, the aldehyde-based resins can be or include a copolymer produced from styrene-acrylic acid, acrylic acid, maleic acid, or any mixture thereof. For example, the aldehyde-based resins can be or include a combination of an amino-aldehyde copolymer and/or a phenol-aldehyde copolymer and a polyacrylic acid, for example, urea-formaldehyde-polyacrylic acid, melamine-formaldehyde-polyacrylic acid, phenol-formaldehyde-polyacrylic acid, or any mixture thereof.

The aldehyde-based resins discussed and described herein can be produced by adding to a reactor containing phenol, an amount of formaldehyde sufficient to establish an initial formaldehyde to phenol (F:P) molar ratio of about 0.6:1 to about 5:1. Aldehyde-based resins can generally have an F:P molar ratio of less than about 1:1 or less than about 0.8:1. Phenolic novolac resins that have a molar deficiency of formaldehyde relative to phenol are generally thermoplastic materials that do not cure in the absence of a cross-linker. Phenol-formaldehyde resole resins can generally have an F:P molar ratio of about 1:1 or greater. In some examples, the aldehyde-based resins can have an F:P molar ratio of about 0.6:1 to about 1:1, about 0.6:1 to less than 1:1, about 0.6:1 to about 0.8:1, about 0.6:1 to less than 0.8:1, about 0.6:1 to about 0.9:1, about 0.6:1 to less than 0.9:1, about 0.6:1 to less than 0.95:1, or about 0.6:1 to less than 1:1. In other examples, the aldehyde-based resins can have an F:P molar ratio of about 1:1 to about 2.65:1, about 1:1 to about 2.5:1, about 1:1 to about 2:1, about 1:1 to about 3:1, about 1:1 to about 4:1, about 1:1 to about 5:1, or about 1:1 to about 6:1. In one or more examples, the aldehyde-based resin can be or include one or more phenol-formaldehyde novolac resins, one or more copolymers thereof, or a mixture thereof. Once combined, mixed, and/or reacted with one or more polyamines, the respective treated aldehyde-based resin can be made and can be or include one or more treated phenol-formaldehyde novolac resins, one or more treated copolymers thereof, or a mixture thereof.

The treated aldehyde-based resin, besides containing the aldehyde-based resin and the polyamine, can also include one or more additives. Illustrative additives can be or include, but are not limited to, one or more dibasic esters, one or more waxes, one or more aminosilanes, one or more organic acids, one or more solvents, one or more pH adjusting agents, or any mixture thereof.

The treated aldehyde-based resin can include one or more dibasic esters. The dibasic ester can be or include one or more compounds that have the chemical formula $CH_3O_2C(CH_2)_nCO_2CH_3$, where n can be 1, 2, 3, 4, or 5. For example, the dibasic ester can be or include dibasic ester-2 (also known as DBE-2), where n can be 3 or 4, such as dimethyl glutarate, dimethyl adipate, or a mixture of dimethyl glutarate and dimethyl adipate. In some examples, the dibasic ester can be or include dibasic ester-9 (also known as DBE-9), where n can be 2 or 3, such as dimethyl glutarate, dimethyl succinate, or a mixture of dimethyl glutarate and dimethyl succinate. In other examples, the dibasic ester can be or include dibasic ester-4 (also known as DBE-4), where n can be 2, such as dimethyl succinate. In other examples, the dibasic ester can be or include dibasic ester-5 (also known as DBE-5), where n can be 3, such as dimethyl glutarate. In other examples, the dibasic ester can be or include dibasic ester-6 (also known as DBE-6), where n can be 4, such as dimethyl adipate. Illustrative dibasic esters can be or include, but are not limited to, one or more of dimethyl glutarate, dimethyl adipate, dimethyl succinate, or any mixture thereof.

The treated aldehyde-based resin can include the dibasic ester in an amount of about 0.1 wt %, about 0.2 wt %, about 0.3 wt %, or about 0.5 wt % to about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.7 wt %, about 1.9 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.5 wt %, about 5 wt %, or greater, based on a solids weight of the aldehyde-based resin. For example, the treated aldehyde-based resin can include the dibasic ester in an amount of about 0.1 wt % to about 5 wt %, about 0.2 wt % to about 4 wt %, about 0.2 wt % to about 2 wt %, about 0.2 wt % to about 1.5 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1.5 wt %, about 1 wt % to about 4 wt %, about 1 wt % to about 3 wt %, about 1 wt % to about 2 wt %, or about 1 wt % to about 1.5 wt %, based on a solids weight of the aldehyde-based resin.

The treated aldehyde-based resin can include one or more aminosilanes, such as, but not limited to 3-aminopropyltrimethoxysilane, 3-aminopropyltriethoxysilane, N-(beta-aminoethyl) gamma-aminopropyltrimethoxysilane, N-(beta-aminoethyl) gamma-aminopropyltriethoxysilane, 3-glycidoxypropyltrimethoxysilane, 3-glycidoxypropyltriethoxysilane, isomers thereof, salts thereof, or any mixture thereof. The treated aldehyde-based resin can include the aminosilane in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include the aminosilane in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin.

The treated aldehyde-based resin can include one or more waxes, such as, synthetic wax, natural wax, or a mixture thereof. Illustrative waxes can be or include, but are not limited to, paraffin waxes, polyethylene waxes, N,N'-ethylenebis(stearamide) waxes, metallic stearate waxes (e.g., calcium stearate, zinc stearate, lithium stearate), isomers thereof, salts thereof, or any mixture thereof. Illustrative metallic stearate waxes can be or include, but are not limited to, calcium stearate, zinc stearate, aluminum stearate, magnesium stearate, lithium stearate, sodium stearate, potassium stearate, isomers thereof, salts thereof, or any mixture thereof. One illustrative synthetic wax can be or include N,N'-ethylenebis(stearamide), commercially available as ACRAWAX C® wax. In some examples, the treated aldehyde-based resin can include synthetic wax beads. The treated aldehyde-based resin can include the wax in an amount of about 0.1 wt %, about 0.2 wt %, about 0.3 wt %, or about 0.5 wt % to about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.7 wt %, about 1.9 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.5 wt %, about 5 wt %, or greater, based on a solids weight of the aldehyde-based resin. For example, the treated aldehyde-based resin can include the wax in an amount of about 0.1 wt % to about 5 wt %, about 0.2 wt % to about 4 wt %, about 0.2 wt % to about 2 wt %, about 0.2 wt % to about 1.5 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1.5 wt %, about 1 wt % to about 4 wt %, about 1 wt % to about 3 wt %, about 1 wt % to about 2 wt %, or about 1 wt % to about 1.5 wt %, based on a solids weight of the aldehyde-based resin.

The treated aldehyde-based resin can include one or more organic acids that can be or include, but are not limited to, salicylic acid, benzoic acid, maleic acid, citric acid, succinic acid, oxalic acid, isomers thereof, salts thereof, hydrates thereof, or any mixture thereof. The treated aldehyde-based resin can include the organic acid in an amount of about 0.05 wt %, about 0.07 wt %, about 0.09 wt %, or about 0.1 wt % to about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.85 wt %, about 0.9 wt %, about 0.95 wt %, about 1 wt %, about 1.2 wt %, about 1.5 wt %, about 1.7 wt %, about 2 wt %, about 2.5 wt %, about 3 wt %, or greater, based on a solids weight of the aldehyde-based resin. For example, the treated aldehyde-based resin can include the organic acid in an amount of about 0.05 wt % to about 3 wt %, about 0.07 wt % to about 2 wt %, about 0.1 wt % to about 3 wt %, about 0.1 wt % to about 2 wt %, about 0.1 wt % to about 1 wt %, about 0.2 wt % to about 3 wt %, about 0.2 wt % to about 2 wt %, about 0.2 wt % to about 1 wt %, about 0.4 wt % to about 3 wt %, about 0.4 wt % to about 2 wt %, or about 0.4 wt % to about 1 wt %, based on a solids weight of the aldehyde-based resin.

The treated aldehyde-based resin can include one or more pH adjusting agents, such as, one or more acids or one or more bases. Illustrative acids can be or include, but are not limited to, sulfuric acid, phosphoric acid, hydrochloric acid, salts thereof, or any mixture thereof. Illustrative bases can be or include, but are not limited to, ammonium hydroxide, lithium hydroxide, sodium hydroxide, potassium hydroxide, urea, urea compounds, amines, salts thereof, or any mixture thereof. In some examples, the treated aldehyde-based resin can include sulfuric acid and ammonium hydroxide. The treated aldehyde-based resin can include the pH adjusting agent in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include the pH adjusting agent in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin. In some examples, the pH adjusting agent can be or include sulfuric acid in an amount of about 0.05 wt % to about 0.4 wt % and ammonium hydroxide in an amount of about 0.1 wt % to about 1 wt %.

The treated aldehyde-based resin can include one or more solvents, such as, but not limited to water, one or more organic solvents (e.g., ethers, alkanes, alcohols, and/or aromatics), or any mixture thereof. In some examples, the treated aldehyde-based resin can include water. The treated aldehyde-based resin can include water or a solvent in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include water or a solvent in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin.

The treated aldehyde-based resin can have a number average molecular weight ($M_n$) of about 500, about 1,000, about 1,500, or about 2,000 to about 2,500, about 3,000, about 3,500, about 4,000, about 4,500, about 5,000, about 6,000, about 7,000, about 8,000, about 9,000, about 10,000, or greater. For example, the $M_n$ of the treated aldehyde-based resin can be about 500 to about 10,000, about 1,000 to about 8,000, about 1,500 to about 6,000, about 1,500 to about 5,500, about 1,500 to about 5,000, about 1,500 to about 4,500, about 1,500 to about 4,000, about 1,500 to about 3,500, about 1,500 to about 3,000, about 1,500 to about 2,500, about 2,000 to about 6,000, about 2,000 to about 5,500, about 2,000 to about 5,000, about 2,000 to about 4,500, about 2,000 to about 4,000, about 2,000 to about 3,500, about 2,000 to about 3,000, about 2,000 to about 2,500. In some examples, the $M_n$ of the treated aldehyde-based resin can be about 2,000 to about 5,500 or about 2,500 to about 5,000.

The treated aldehyde-based resin can have a weight average molecular weight ($M_w$) of about 300, about 400, about 500, or about 600 to about 700, about 750, about 800, about 850, about 900, about 950, about 1,000, about 1,200, about 1,500, about 1,800, about 2,000, about 3,000, about 4,000, or greater. For example, the $M_w$ of the treated aldehyde-based resin can be about 300 to about 4,000, about 500 to about 3,000, about 500 to about 2,000, about 600 to about 3,000, about 600 to about 2,000, about 600 to about 1,000, about 600 to about 900, about 700 to about 900, about 750 to about 900, or about 800 to about 900. In some examples, the $M_w$ of the treated aldehyde-based resin can be about 500 to about 1,000, about 750 to about 900, or about 800 to about 900.

The treated aldehyde-based resin can have a z-average molecular weight ($M_z$) of about 1,000, about 2,000, about 3,000, about 4,000, or about 5,000 to about 6,000, about 6,500, about 7,000, about 7,500, about 8,000, about 8,500, about 9,000, about 9,500, about 10,000, about 15,000, about 20,000, about 30,000, about 50,000, about 70,000, about 80,000, about 100,000, or greater. For example, the $M_z$ of the treated aldehyde-based resin can be about 500 to about 80,000, about 1,000 to about 15,000, about 3,000 to about 15,000, about 5,000 to about 15,000, about 6,000 to about 15,000, about 7,000 to about 15,000, about 1,000 to about 10,000, about 3,000 to about 10,000, about 5,000 to about 10,000, about 6,000 to about 10,000, about 7,000 to about 10,000, about 1,000 to about 8,500, about 3,000 to about 8,500, about 5,000 to about 8,500, about 6,000 to about 8,500, about 6,000 to about 8,000, about 6,000 to about 7,500, or about 7,000 to about 7,500. In some specific examples, the $M_z$ of the treated aldehyde-based resin can be about 5,000 to about 9,000 or about 6,000 to about 8,000. In other examples, the $M_z$ of the treated aldehyde-based resin can be about 5,000 to about 100,000, about 10,000 to about 100,000, about 20,000 to about 100,000, about 40,000 to about 100,000, about 50,000 to about 100,000, about 60,000 to about 100,000, about 70,000 to about 100,000, about 10,000 to about 85,000, about 20,000 to about 85,000, about 40,000 to about 85,000, about 50,000 to about 85,000, about 60,000 to about 85,000, about 70,000 to about 85,000, or about 70,000 to about 80,000. In some specific examples, the $M_z$ of the treated aldehyde-based resin can be about 50,000 to about 100,000 or about 60,000 to about 85,000.

The number average molecular weight ($M_n$), the weight average molecular weight ($M_w$), and the z-average molecular weight ($M_z$) can be determined for the resins and/or polymers discussed and described herein. The $M_n$ is the arithmetic mean or average of the molecular masses or weights of the individual macromolecules of the polymer or resin. The $M_w$ is also the arithmetic mean or average of the molecular masses or weights of the individual macromolecules of the polymer or resin, but takes into account the molecular mass or weight of a chain in determining contributions to the molecular weight average. The $M_z$ is the third moment or third power average molar mass or weight. The $M_n$, the $M_w$, and the $M_z$ can be measured using gel permeation chromatography (GPC), also known as size exclusion chromatography (SEC). This technique utilizes an instrument containing columns packed with porous beads, an elution solvent, and detector in order to separate polymer molecules of different sizes, and is well known to those skilled in the art.

The high strength coated proppants can be utilized to hold open formation fractures formed during a hydraulic fracturing process. In some examples, each coated proppant can have a single particle contained therein. Alternatively, in other examples, each coated proppant can have two or more particles contained therein. The particles can be or include, but are not limited to, sand, powders, gravel, beads, pellets, nut or seed media, mineral fibers, natural fibers, synthetic fibers, ceramics, or any mixture thereof. Illustrative sands that can be utilized as particles can be or include, but are not limited to, one or more frac sand, silica sand, glass (e.g., crushed or powdered glass), quartz, silicon dioxide, silica, silicates, other silicon oxide sources, or any mixture thereof. The type of sand used as the particles can have a variety of shapes and sizes. The sand may be relatively rounded or have spherical or substantially spherical grains or the sand may be an angular sand having sharp or less rounded grains. Similarly, particulates other than sand, such as ceramics, may be spherical or substantially spherical with rounded edges or angular with sharp or jagged edges.

Illustrative beads and pellets that can be utilized as particles can be or include, but are not limited to, one or more metals (e.g., aluminum, iron, steel, or alloys thereof), glass, sintered bauxite, ceramics (e.g., aluminum, zirconium, hafnium, and/or titanium oxide sources), mineral particulates, synthetic polymers or resins (e.g., nylon, polyethylene, or polypropylene), or any mixture thereof. In some examples, the particles can be or include rigid, substantially spherical pellets or spherical glass beads, such as UCAR® props, commercially available from Union Carbide Corporation. In some examples, the particles can be or include metallic beads and/or metallic pellets that contain one or more metals, such as, but not limited to, aluminum, iron, steel, magnesium, tin, bismuth, antimony, alloys thereof, or any mixture thereof. In other examples, the particles can be or include ceramic pellets that contain one or more ceramic materials.

The particles can include, but are not limited to, one or more silicon oxide sources (e.g., silica, silicates, silicon dioxide, or other silicon oxides), aluminum oxide sources (e.g., alumina, aluminates, or other aluminum oxides), zirconium oxide sources (e.g., zirconia, zirconium dioxide, or other zirconium oxides), hafnium oxide sources (e.g., hafnia, hafnium dioxide, or other hafnium oxides), titanium oxide sources (e.g., titania, titanium dioxide, or other titanium oxides), carbonate sources, other ceramic materials, other metal oxides, or any mixture thereof.

Nut or seed media can be, include, and/or be produced from, but are not limited to, nuts, nut shells, pits, seeds, and/or seed hulls, including tree nuts, fruit pits, and oil seeds. The nuts and/or seeds can be whole, broken, chopped, crushed, milled, ground, powdered, or otherwise processed or size-reduced, or any mixture thereof. Illustrative nuts or seeds can include, but are not limited to, almond, walnut, pecan, chestnut, hickory, cashew, peanut, macadamia, sunflower, linseed, rapeseed, castor seed, poppy seed, hemp seed, tallow tree seed, safflower seed, mustard seed, olive pits, other tree nuts, other oilseeds, portions thereof, or any mixture thereof and can be used in or to produce the nut or seed media.

In some examples, the uncoated proppant can have a mesh size (or equivalent value of average particle size in parenthesis) of about 270 (about 53 µm), about 230 (about 63 µm), about 200 (about 75 µm), about 120 (about 125 µm), or about 100 (about 150 µm) to about 80 (about 180 µm), about 60 (about 250 µm), about 40 (about 425 µm), about 30 (about 600 µm), about 20 (about 850 µm), or about 10 (about 2 mm). For example, the uncoated proppant can have a mesh size (or equivalent average particle size) of about 270 (about 53 µm) to about 10 (about 2 mm), about 230 (about 63 µm) to about 10 (about 2 mm), about 200 (about 75 µm) to about 10 (about 2 mm), about 200 (about 75 µm) to about 20 (about 850 µm), about 100 (about 150 µm) to about 10 (about 2 mm), or about 100 (about 150 µm) to about 20 (about 850 µm). In other examples, the uncoated proppant can have a mesh size (or equivalent average particle size) of about 120 (about 125 µm), about 100 (about 150 µm), about 80 (about 180 µm), about 60 (about 250 µm), or about 40 (about 425 µm) to about 30 (about 600 µm), about 20 (about 850 µm), or about 10 (about 2 mm). For example, the uncoated proppant can have a mesh size (or equivalent average particle size) of about 80 (about 180 µm) to about 40 (about 425 µm), about 80 (about 180 µm) to about 20 (about 850 µm), about 80 (about 180 µm) to about 10 (about 2 mm), about 60 (about 250 µm) to about 40 (about 425 µm), about 60 (about 250 µm) to about 20 (about 850 µm), about 60 (about 250 µm) to about 10 (about 2 mm), about 40 (about 425 µm) to about 30 (about 600 µm), about 40 (about 425 µm) to about 20 (about 850 µm), or about 40 (about 425 µm) to about 10 (about 2 mm).

In some specific examples, the uncoated particles can be silica sand or frac sand and can have a mesh size (or equivalent average particle size) of about 40 (about 425 µm) or about 20 (about 850 µm) to about 10 (about 2 mm). In other specific examples, the uncoated particles can be gravel, beads, or pellets and can have a mesh size (or equivalent average particle size) of about 200 (about 75 µm) to about 10 (about 2 mm). The mesh size of the particles or proppants described and discussed herein can be measured according to the U.S. Standard Sieve Series and the average particle size of the particles or proppants described and discussed herein can be calculated from the measured mesh size. Further description for measuring and calculating mesh size and average particle size can be found in Measurement of Properties of Proppants Used in Hydraulic Fracturing and Gravel-Packing Operations, ANSI/API Recommended Practice 19C, May 2008, (ISO 13503-2:2006).

In some examples, a method for producing the coated proppant having the cured resin at least partially encasing or coating each of the uncoated particles is provided. The cured resin can include the treated aldehyde-based resin (e.g., one or more aldehyde-based resins and one or more polyamines) and one or more cross-linkers (e.g., hexamethylenetetramine). A plurality of particles (e.g., sand), the treated aldehyde-based resin, and the cross-linker can be combined in a blender, mixer, or other device to produce the coated proppant. In some examples, the particles can be heated to a temperature of about 50° C. to about 300° C. and combined with the treated aldehyde-based resin in the mixer and mixed for about 0.1 min to about 5 min. Thereafter, the cross-linker can be added to or combined with the mixture and mixed for about 1 min to about 10 min to produce coated proppants. The coated proppants can be removed from the mixer and allowed to cool to ambient temperature (e.g., about 23° C.)

to produce the coated proppant having the cured resin at least partially encasing or coating each of the particles.

In some examples, the uncoated particles can be heated to a temperature of about 50° C., about 80° C., about 100° C., or about 120° C. to about 150° C., about 180° C., about 200° C., about 250° C., or about 300° C. when contacted with the treated aldehyde-based resin and/or the cross-linker. For example, the particles can be heated to a temperature about 50° C. to about 300° C., about 50° C. to about 200° C., about 50° C. to about 150° C., about 50° C. to about 100° C., or about 100° C. to about 200° C. when contacted with the treated aldehyde-based resin and/or the cross-linker.

The particles and the treated aldehyde-based resin can be mixed for about 0.1 min, about 0.2 min, about 0.3 min, or about 0.4 min to about 0.6 min, about 0.7 min, about 0.8 min, about 0.9 min, or about 1 min to about 2 min, about 3 min, about 4 min, or about 5 min. For example, the particles and the treated aldehyde-based resin can be mixed for about 0.1 min to about 5 min, about 0.2 min to about 3 min, about 0.3 min to about 1 min, about 0.2 min to about 0.8 min, or about 0.4 min to about 0.6 min. The particles, the treated aldehyde-based resin, and the cross-linker can be mixed for about 1 min, about 1.5 min, or about 2 min to about 3 min, about 5 min, about 7 min, or about 10 min. For example, the particles, the treated aldehyde-based resin, and the cross-linker can be mixed for about 1 min to about 10 min, about 1 min to about 5 min, about 1 min to about 3 min, or about 1 min to about 2 min. Additional details related to methods for producing coated proppants can include those discussed and described in U.S. Pat. Nos. 8,003,214; 8,133,587; and 8,778,495.

The coated proppant can have the cured resin at least partially encasing or completely encasing one or more particles. The cured resin containing one or more aldehyde-based resins and one or more polyamines can surprisingly and unexpectedly provide coated proppants with a significantly greater dry crush strength value as compared to traditional proppants. Without wishing to be bound by theory, it is believed that the polyamines having additional amino groups can provide extra points for hydrogen bonding between the polymer/resin chains in the treated aldehyde-based resin and the cured resin. Therefore, the increased hydrogen bonding can provide greater strength and hardness to the treated aldehyde-based resin and the cured resin relative to the untreated aldehyde-based resin. The dry crush strengths can be measured or determined based on the Proppant Crush Resistance Test Procedure under ISO 13503-2:2011.

The coated proppant can have a dry crush strength of about 0.1 wt %, about 0.2 wt %, about 0.3 wt %, about 0.5 wt %, about 0.7 wt %, or about 0.9 wt % to about 1 wt %, about 1.2 wt %, about 1.5 wt %, about 1.7 wt %, about 2 wt %, about 2.2 wt %, about 2.5 wt %, about 2.7 wt %, about 3 wt %, about 3.2 wt %, about 3.5 wt %, about 3.7 wt %, about 4 wt %, about 4.2 wt %, about 4.5 wt %, about 4.7 wt %, about 5 wt %, about 5.2 wt %, about 5.5 wt %, about 5.7 wt %, about 6 wt %, about 6.5 wt %, or about 7 wt %, at a pressure of about 55.2 MPa (about 8,000 psi). For example, the coated proppant can have a dry crush strength of about 0.1 wt % to about 5 wt %, about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, at a pressure of about 55.2 MPa. In some examples, the coated proppant can have a dry crush strength of about 0.2 wt % to about 5 wt %, about 0.2 wt % to about 4.5 wt %, about 0.2 wt % to about 4 wt %, about 0.2 wt % to about 3.5 wt %, about 0.2 wt % to about 3 wt %, about 0.2 wt % to about 2.5 wt %, about 0.2 wt % to about 2 wt %, about 0.2 wt % to about 1.5 wt %, about 0.2 wt % to about 1 wt %, about 0.2 wt % to about 0.5 wt %, at a pressure of about 55.2 MPa. In other examples, the coated proppant can have a dry crush strength of about 0.5 wt % to less than 5 wt %, about 0.5 wt % to less than 4.5 wt %, about 0.5 wt % to less than 4 wt %, about 0.5 wt % to less than 3.5 wt %, about 0.5 wt % to less than 3 wt %, about 0.5 wt % to less than 2.5 wt %, about 0.5 wt % to less than 2 wt %, about 0.5 wt % to less than 1.5 wt %, or about 0.5 wt % to less than 1 wt %, the at a pressure of about 55.2 MPa.

The coating on the coated proppant can have a thickness of about 0.1 mil (2.54 μm), about 0.2 mil (5.08 μm), about 0.3 mil (7.62 μm), about 0.5 mil (12.7 μm), about 0.7 mil (17.8 μm), or about 0.9 mil (22.9 μm), to about 1 mil (25.4 μm), about 2 mil (50.8 μm), about 3 mil (76.2 μm), about 4 mil (102 μm), about 5 mil (127 μm), about 6 mil (152 μm), about 7 mil (178 μm), about 8 mil (203 μm), about 9 mil (229 μm), about 10 mil (254 μm), about 15 mil (381 μm), about 20 mil (508 μm), or greater. For example, the coating on the coated proppant can have a thickness of about 0.1 mil (2.54 μm) to about 20 mil (508 μm), about 0.1 mil (2.54 μm) to about 10 mil (254 μm), or about 0.1 mil (2.54 μm) to about 5 mil (127 μm). In some examples, the coated proppant can have a cured resin with a thickness of about 0.1 mil (2.54 μm) to about 10 mil (254 μm) or about 0.1 mil (2.54 μm) to about 5 mil (127 μm).

The amount or weight of the cured resin on the coated proppants can be based on the weight of the uncoated particle. The coated proppants can include the treated aldehyde-based resin in an amount of about 0.5 wt %, about 0.7 wt %, about 0.9 wt %, or about 1 wt % to about 1.1 wt %, about 1.3 wt %, about 1.5 wt %, about 1.7 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.1 wt %, about 4.3 wt %, about 4.5 wt %, about 4.7 wt %, about 4.9 wt %, about 5 wt %, about 5.5 wt %, about 6 wt %, about 6.5 wt %, about 7 wt %, about 7.5 wt %, about 8 wt %, about 8.5 wt %, about 9 wt %, about 10 wt %, about 11 wt %, about 12 wt %, or greater, based on a dry weight of the particles. For example, the coated proppants coating can include the treated aldehyde-based resin in an amount of about 0.5 wt % to about 12 wt %, about 0.5 wt % to about 10 wt %, about 1 wt % to about 10 wt %, about 1 wt % to about 8 wt %, about 1 wt % to about 6 wt %, about 1 wt % to about 5 wt %, about 2 wt % to about 10 wt %, about 2 wt % to about 8 wt %, about 2 wt % to about 6 wt %, about 2 wt % to about 5 wt %, about 3 wt % to about 10 wt %, about 3 wt % to about 8 wt %, about 3 wt % to about 6 wt %, or about 3 wt % to about 5 wt %, based on a dry weight of the particles.

The amount or weight of the cured resin on the coated proppants can also be based on the total weight of the cured resin and the uncoated particle. The amount or weight of the coating on the coated proppant can be about 0.2 wt %, about 0.5 wt %, about 0.7 wt %, about 0.9 wt %, or about 1 wt % to about 5 wt %, about 6 wt %, about 7 wt %, about 8 wt %, about 9 wt %, about 10 wt %, or about 12 wt %, based on the total weight of the coating and the particle. For example, the coating on the coated proppant can be about 0.2 wt % to about 12 wt %, about 0.5 wt % to about 10 wt %, about 0.5 wt % to about 5 wt %, about 1 wt % to about 12 wt %, about 1 wt % to about 10 wt %, or about 1 wt % to about 5 wt % of the coated proppant, based on the total weight of the cured resin and the particles. In some examples, the coated proppant can have a cured resin that can be about 0.5 wt % to about 10 wt % or about 1 wt % to about 12 wt % of the coated proppant, based on the total weight of the cured resin and the particles.

The coated particles can have a mesh size (or equivalent average particle size) of about 230 (about 63 µm), about 200 (about 75 µm), about 120 (about 125 µm), or about 100 (about 150 µm) to about 80 (about 180 µm), about 60 (about 250 µm), about 40 (about 425 µm), about 30 (about 600 µm), about 20 (about 850 µm), about 10 (about 2 mm), about 8 (about 2.38 mm), about 6 (about 3.36 mm), or about 4 (about 4.76 mm). For example, the coated particles can have a mesh size (or equivalent average particle size) of about 200 (about 75 µm) to about 4 (about 4.76 mm), about 200 (about 75 µm) to about 6 (about 3.36 mm), about 200 (about 75 µm) to about 20 (about 850 µm), about 200 (about 75 µm) to about 80 (about 180 µm), about 100 (about 150 µm) to about 4 (about 4.76 mm), about 100 (about 150 µm) to about 6 (about 3.36 mm), about 100 (about 150 µm) to about 20 (about 850 µm), or about 100 (about 150 µm) to about 80 (about 180 µm).

The coated particles can have a mesh size (or equivalent average particle size) of about 100 (about 150 µm), about 80 (about 180 µm), or about 60 (about 250 µm) to about 40 (about 425 µm), about 30 (about 600 µm), about 20 (about 850 µm), about 10 (about 2 mm), about 8 (about 2.38 mm), about 6 (about 3.36 mm), or about 4 (about 4.76 mm). For example, the coated particles can have a mesh size (or equivalent average particle size) of about 100 (about 150 µm) to about 4 (about 4.76 mm), about 100 (about 150 µm) to about 6 (about 3.36 mm), about 100 (about 150 µm) to about 20 (about 850 µm), about 80 (about 180 µm) to about 4 (about 4.76 mm), about 80 (about 180 µm) to about 6 (about 3.36 mm), about 80 (about 180 µm) to about 20 (about 850 µm), about 60 (about 250 µm) to about 4 (about 4.76 mm), about 60 (about 250 µm) to about 8 (about 2.38 mm), or about 60 (about 250 µm) to about 20 (about 850 µm). In some specific examples, the coated particles can have a mesh size (or equivalent average particle size) of about 40 (about 425 µm) to about 4 (about 4.76 mm), about 40 (about 425 µm) to about 20 (about 850 µm), about 20 (about 850 µm) to about 4 (about 4.76 mm), or about 10 (about 2 mm) to about 4 (about 4.76 mm).

The cured resin can include one or more cross-linkers. Illustrative cross-linkers can be or include, but are not limited to, hexamethylenetetramine, bismethylol cresols, bisoxazolines (e.g., BOX or PyBOX class of ligands), bisbenzoxazines, epoxy resins, phenol-formaldehyde resole resins, solid resole polymers or resins, isomers thereof, solutions thereof, or any mixture thereof. In some examples, the cross-linker can be or include hexamethylenetetramine. The cured resin can include the cross-linker in an amount of about 1 wt %, about 2 wt %, about 3 wt %, about 4 wt %, or about 5 wt % to about 6 wt %, about 8 wt %, about 10 wt %, about 11 wt %, about 12 wt %, about 13 wt %, about 15 wt %, about 16 wt %, about 18 wt %, about 20 wt %, about 22 wt %, about 24 wt %, about 25 wt %, about 26 wt %, about 28 wt %, or about 30 wt %, based on a solids weight of the treated aldehyde-based resin. For example, the cured resin can include the cross-linker in an amount of about 1 wt % to about 30 wt %, about 2 wt % to about 20 wt %, about 3 wt % to about 20 wt %, about 4 wt % to about 20 wt %, about 5 wt % to about 20 wt %, about 8 wt % to about 20 wt %, about 10 wt % to about 20 wt %, about 2 wt % to about 15 wt %, about 3 wt % to about 15 wt %, about 4 wt % to about 15 wt %, about 5 wt % to about 15 wt %, about 8 wt % to about 15 wt %, or about 10 wt % to about 15 wt %, based on a solids weight of the treated aldehyde-based resin.

In other examples, the cured resin can include the cross-linker in an amount of about 0.05 wt %, about 0.07 wt %, about 0.09 wt %, or about 0.1 wt % to about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.9 wt %, about 1 wt %, about 1.1 wt %, about 1.2 wt %, about 1.3 wt %, about 1.5 wt %, about 1.7 wt %, about 1.9 wt %, about 2 wt %, about 2.5 wt %, about 3 wt %, about 4 wt %, or about 5 wt %, based on a dry weight of the particles. For example, the cured resin can include the cross-linker in an amount of about 0.05 wt % to about 5 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.1 wt % to about 0.8 wt %, about 0.1 wt % to about 0.5 wt %, about 0.1 wt % to about 0.4 wt %, about 0.1 wt % to about 0.3 wt %, about 0.1 wt % to about 0.2 wt %, about 0.2 wt % to about 0.8 wt %, about 0.2 wt % to about 0.6 wt %, about 0.2 wt % to about 0.4 wt %, based on a dry weight of the particles.

The coated proppants discussed and described herein can be utilized in processes and applications, such as, but not limited to, hydraulic fracturing, gravel packing, and/or well formation treatments. In some examples, a method for treating a subterranean formation can include introducing a fluid that contains a plurality of coated proppants into a wellbore, and introducing the plurality of coated proppants into the subterranean formation via the wellbore. Each coated proppant can include the cured resin at least partially or completely encasing or coating one or more particles. The cured resin can be or include one or more of the products made from one or more of the aldehyde-based resins and one or more of the polyamines. The polyamine can be or include, but is not limited to, one or more aromatic polyamines, one or more poly($C_2$-$C_5$ alkylene) polyamines, or a mixture thereof.

In some examples, the method can include servicing the subterranean formation with the plurality of coated proppants. The subterranean formation can be serviced with the coated proppants by introducing the coated proppants into desirable portions or areas of the wellbores and/or the subterranean formations, such as in fractures, cracks, holes, openings, and other orifices within the wellbores and/or the subterranean formations including the sidewalls or surfaces thereof. The proppants can be used in processes or treatments typically performed in wellbores and/or subterranean formations, including, but not limited to, hydraulic fracturing, gravel packing, and well formation treatments.

An agglomerated framework of coated proppants in the subterranean formation can reduce solid particle flow-back and/or the transport of formation fines from the subterranean formation. Additional details related to methods for using the coated proppants having the cured resin can include those discussed and described in U.S. Pat. Nos. 8,003,214; 8,133,587; and 8,778,495.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

For Examples 1-5, the polyamines used to produce the treated novolac resins were diethylenetriamine (DETA) and 1,4-diaminobenzene (also known as p-diaminobenzene (PDAB or p-DAB) or p-phenylenediamine (PPD)). The dibasic ester-2 (also known as DBE-2) contained a mixture of dimethyl glutarate and dimethyl adipate and was acquired from Invista. The synthetic wax was KEMAMIDE® EBS PRL wax, acquired from Supreme Resources.

The product properties for Examples 1-5 are provided in Table 1. Gel Permeation Chromatography (GPC) was used to obtain the data for determining the molecular weight distribution. The number average molecular weight ($M_n$), the weight average molecular weight ($M_w$), and the z-average molecular weight ($M_z$), for the treated novolac resins are provided in Table 1.

Base PF Resin—

In a 2 L capacity glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 4 g of aniline and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces to form a base PF resin.

Example 1

A 2 L capacity glass resin kettle equipped with a temperature controlled heating mantle, thermometer, and agitator, was charged with about 1,000 g of the base PF resin in chunk or flake form (prepared as described above). The heating mantel was turned on and the base PF resin within the kettle was heated to a temperature of about 137° C. After heating for about 30 min, the base PF resin melted into a liquid state. About 50 g of PDAB (about 5 wt % of the base PF resin) in powder form was added to the melted base PF resin at about 137° C. The mixture was agitated and heated to about 140° C. to disperse and melt the PDAB. After agitating and heating for about 30 min, the molten mixture was poured out of the kettle onto a cooling pan lined in aluminum foil. The molten resin cooled to ambient temperature (about 23° C.) and solidified into a thin sheet having a thickness of about 6 mm. The resin sheet was struck with a hammer to break the resin sheet into pieces of about 1 cm×about 1 cm×about 0.6 cm. The treated novolac resin was translucent and had a darker in color than the starting base PF resin.

Example 2

In a 2 L capacity glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 4 g of PDAB and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 857 g/mol, the $M_n$ was about 4,845 g/mol, and the $M_z$ was about 71,578 g/mol.

Example 3

In a 2 L capacity glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.3 g of PDAB and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 830 g/mol, the $M_n$ was about 5,125 g/mol, and the $M_z$ was about 76,329 g/mol.

Example 4

In a 2 L capacity glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.22 g of DETA (one half molar equivalent relative to aniline) and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 894 g/mol, the $M_n$ was about 2,673 g/mol, and the $M_z$ was about 7,102 g/mol.

Example 5

In a 2 L capacity glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.22 g of DETA (one half molar equivalent relative to aniline) and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 882 g/mol, the $M_n$ was about 2,699 g/mol, and the $M_z$ was about 7,120 g/mol.

TABLE 1

Treated novolac resin Synthesis Results

| Ex | Polyamine | Amount of Polyamine (wt %*) | $M_w$ (g/mol) | $M_n$ (g/mol) | $M_z$ (g/mol) |
|---|---|---|---|---|---|
| 1 | PDAB | 4.76 | — | — | — |
| 2 | PDAB | 0.4 | 857 | 4,845 | 71,578 |
| 3 | PDAB | 0.23 | 830 | 5,125 | 76,329 |
| 4 | DETA | 0.22 | 894 | 2,673 | 7,102 |
| 5 | DETA | 0.22 | 882 | 2,699 | 7,120 |

*wt % is based on a solids weight of the PF resin

For Examples 6-12, proppants were produced by coating sand particles with PF resins. Specifically, in Examples 7 and 9-12, sand particles were coated with the treated novolac resins prepared in Experiments 1-5, respectively, and in Examples 6 and 8, sand particles were coated with the base PF resin, as comparative examples. The sand used was 20/40 frac sand, commercially available from Unimin Corporation. The "hexamine solution" used was an aqueous solution containing about 40 wt % of hexamethylenetetramine and about 60 wt % of water. All dry crush strength values measured in Examples 6-12 were determined based on the Proppant Crush Resistance Test Procedure under ISO 13503-2:2011.

Comparative Example 6

About 2,000 g of sand (preheated to about 260° C.) and about 60 g of the base PF resin were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 3.7 wt % at about 8,000 MPa and about 10.7 wt % at about 12,000 MPa.

Example 7

About 2,000 g of sand (preheated to about 260° C.) and about 60 g of the Example 1 treated novolac resin were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.9 wt % at about 8,000 MPa and about 8.3 wt % at about 12,000 MPa.

Comparative Example 8

About 2,000 g of sand (preheated to about 260° C.) and about 60 g of the base PF resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.3 wt % at about 8,000 MPa.

Example 9

About 2,000 g of sand (preheated to about 260° C.) and about 60 g of the Example 2 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2 wt % at about 8,000 MPa.

Example 10

About 2,000 g of sand (preheated to about 260° C.) and about 60 g of the Example 3 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 1.9 wt % at about 8,000 MPa.

Example 11

About 2,000 g of sand (preheated to about 260° C.) and about 60 g of the Example 4 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.2 wt % at about 8,000 MPa.

Example 12

About 2,000 g of sand (preheated to about 260° C.) and about 60 g of the Example 5 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 1.5 wt % at about 8,000 MPa.

The proppants (coated sand particles) were sieved using two sieves—a sieve with an average particle size of about 850 μm (a #20 mesh sieve) and a sieve with an average particle size of about 0.4 mm (a #40 mesh sieve). A sample of about 15 g of the sieved proppants was loaded into the test cell, constantly moving the test cell until a leveled surface of proppants was obtained. A press with a piston was used to apply stress to the sample in the test cell. The piston was inserted into the test cell and the press applied stress to the sample in the test cell. The stress was increased at a constant rate until the desired stress was achieved—either about 55.2 MPa (about 8,000 psi, in Examples 6-12) or about 82.7 MPa (about 12,000 psi, in Examples 6-7). The sample was held at the desired stress for about 2 min. The crushed coated proppant was sieved and the amount of fines produced was reported. The results for Examples 6-12 are provided below in Table 2.

Example 13

About 2,000 g of sand (preheated to about 260° C.), about 60 g of the base PF resin, and about 3 g of PDAB (about 5 wt % of the base PF resin) in powder form were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C.

TABLE 2

Dry Crush Strength of Coated Proppant

| Examples | PF resin (Exp #) | Dry Crush (wt %) | Crush Pressure (MPa) |
|---|---|---|---|
| CEx. 6 | base resin | 3.7 | 55.2 |
|  |  | 10.7 | 82.7 |
| Ex. 7 | Ex. 1 | 2.9 | 55.2 |
|  |  | 8.3 | 82.7 |
| CEx. 8 | base resin | 2.3 | 55.2 |
| Ex. 9 | Ex. 2 | 2 | 55.2 |
| Ex. 10 | Ex. 3 | 1.9 | 55.2 |
| Ex. 11 | Ex. 4 | 2.2 | 55.2 |
| Ex. 12 | Ex. 5 | 1.5 | 55.2 |

Embodiments of the present disclosure further relate to any one or more of the following paragraphs:

1. A coated proppant, comprising: a particle; and a cured resin at least partially encasing the particle, wherein, prior to curing, the resin comprises a treated aldehyde-based resin comprising an aldehyde-based resin and a polyamine, wherein the polyamine comprises an aromatic polyamine, a poly($C_2$-$C_5$ alkylene) polyamine, or a mixture thereof, and wherein the coated proppant has a dry crush strength of about 0.1 wt % to about 3 wt % at a pressure of about 55.2 MPa, based on the Proppant Crush Resistance Test Procedure under ISO 13503-2:2011.

2. A method for making a coated proppant, comprising: reacting an aldehyde-based resin and a polyamine to produce a treated aldehyde-based resin, wherein the polyamine comprises an aromatic polyamine, a poly($C_2$-$C_5$ alkylene) polyamine, or a mixture thereof; and combining the treated aldehyde-based resin, a cross-linker, and a plurality of particles to produce a plurality of coated proppants having a cured resin, wherein the cured resin at least partially encases each of the particles, wherein the cured resin comprises a reaction product of the treated aldehyde-based resin and the cross-linker, and wherein the coated proppants have a dry crush strength of about 0.1 wt % to about 3 wt % at a pressure of about 55.2 MPa, based on the Proppant Crush Resistance Test Procedure under ISO 13503-2:2011.

3. The coated proppant or the method of paragraph 1 or 2, wherein the polyamine is combined or reacted with the aldehyde-based resin in an amount of about 0.05 wt % to about 10 wt %, based on a solids weight of the aldehyde-based resin, to produce the treated aldehyde-based resin.

4. The coated proppant or the method of any one of paragraphs 1-3, wherein reacting the aldehyde-based resin and the polyamine comprises: combining formaldehyde and phenol to produce a first mixture; heating the first mixture to produce the aldehyde-based resin; combining the polyamine and the aldehyde-based resin to produce a second mixture; and heating the second mixture to produce the treated aldehyde-based resin.

5. The coated proppant or the method of paragraph 4, wherein additional formaldehyde is added to the second mixture before producing the treated aldehyde-based resin.

6. The coated proppant or the method of paragraph 4, wherein the polyamine is combined or reacted with the aldehyde-based resin in an amount of about 0.1 wt % to about 1.5 wt %, based on a solids weight of the aldehyde-based resin, to produce the treated aldehyde-based resin.

7. The coated proppant or the method of paragraph 4, wherein the first mixture is heated to a temperature of about 50° C. to about 100° C.

8. The coated proppant or the method of paragraph 4, wherein the second mixture is heated to a temperature of about 110° C. to about 200° C.

9. The coated proppant or the method of paragraph 4, wherein the first mixture is heated to a temperature of about 50° C. to about 100° C., and wherein the second mixture is heated to a temperature of about 110° C. to about 200° C.

10. The coated proppant or the method of any one of paragraphs 1-9, wherein reacting the aldehyde-based resin and the polyamine comprises: heating the aldehyde-based resin having a solid state to produce a molten aldehyde-based resin; adding the polyamine to the molten aldehyde-based resin to produce a molten mixture; and heating the molten mixture to produce the treated aldehyde-based resin.

11. The coated proppant or the method of paragraph 10, wherein the poly amine is combined or reacted with the aldehyde-based resin in an amount of about 1 wt % to about 8 wt %, based on a solids weight of the aldehyde-based resin.

12. The coated proppant or the method of paragraph 10, wherein the aldehyde-based resin having the solid state is heated to a temperature of about 110° C. to about 200° C. to produce the molten phenol-formaldehyde.

13. The coated proppant or the method of paragraph 10, wherein the molten mixture is heated to a temperature of about 110° C. to about 200° C. to produce the treated aldehyde-based resin.

14. The coated proppant or the method of paragraph 10, wherein the aldehyde-based resin having the solid state is heated to a temperature of about 110° C. to about 200° C. to produce the molten phenol-formaldehyde, and wherein the molten mixture is heated to a temperature of about 110° C. to about 200° C. to produce the treated aldehyde-based resin.

15. The coated proppant or the method of any one of paragraphs 1-14, wherein the treated aldehyde-based resin is combined with the cross-linker and the plurality of particles in an amount of about 0.5 wt % to about 10 wt %, based on a dry weight of the particles.

16. The coated proppant or the method of any one of paragraphs 1-15, wherein the cross-linker is combined with the treated aldehyde-based resin and the plurality of particles in an amount of about 0.1 wt % to about 2 wt %, based on a dry weight of the particles.

17. The coated proppant or the method of any one of paragraphs 1-16, wherein the cross-linker comprises hexamethylenetetramine.

18. The coated proppant or the method of any one of paragraphs 1-17, wherein the polyamine comprises an aromatic diamine, an aromatic triamine, a dialkylenetriamine, a trialkylenetetraamine, or any mixture thereof.

19. The coated proppant or the method of any one of paragraphs 1-18, wherein the polyamine comprises the aromatic polyamine.

20. The coated proppant or the method of any one of paragraphs 1-19, wherein the aromatic polyamine comprises 1,3-diaminobenzene, 1,4-diaminobenzene, 1,3-xylylenediamine, 1,4-xylylenediamine, 3,4'-diaminodiphenyl ether, 4,4'-diaminodiphenyl ether, an isomer thereof, a salt thereof, a complex thereof, an adduct thereof, or any mixture thereof.

21. The coated proppant or the method of any one of paragraphs 1-20, wherein the polyamine comprises the poly ($C_2$-$C_5$ alkylene) polyamine.

22. The coated proppant or the method of paragraphs 1-21, wherein the poly($C_2$-$C_5$ alkylene) polyamine comprises a dialkylenetriamine.

23. The coated proppant or the method of any one of paragraphs 1-22, wherein the poly($C_2$-$C_5$ alkylene) polyamine comprises a dialkylenetriamine, and wherein the dialkylenetriamine comprises diethylenetriamine, dipropylenetriamine, dibutylenetriamine, an isomer thereof, a salt thereof, a complex thereof, an adduct thereof, or any mixture thereof.

24. The coated proppant or the method of any one of paragraphs 1-23, wherein the cured resin completely encases the particle.

25. The coated proppant or the method of any one of paragraphs 1-24, wherein the coated proppant has a dry crush strength of about 0.2 wt % to about 2.5 wt % at a pressure of about 55.2 MPa, based on the Proppant Crush Resistance Test Procedure under ISO 13503-2:2011.

26. The coated proppant or the method of any one of paragraphs 1-25, wherein the cured resin completely encases the particle, and wherein the coated proppant has a dry crush strength of about 0.2 wt % to about 2.5 wt % at a pressure of about 55.2 MPa, based on the Proppant Crush Resistance Test Procedure under ISO 13503-2:2011.

27. The coated proppant or the method of any one of paragraphs 1-26, wherein the particles comprise sand.

28. The coated proppant or the method of any one of paragraphs 1-27, wherein the coated proppants have an average particle size of about 180 μm to about 2 mm.

29. The coated proppant or the method of any one of paragraphs 1-28, wherein the particles comprise sand, and wherein the coated proppants have an average particle size of about 180 μm to about 2 mm.

30. The coated proppant or the method of any one of paragraphs 1-29, wherein the treated aldehyde-based resin comprises about 0.05 wt % to about 10 wt % of the polyamine, based on a solids weight of the aldehyde-based resin.

31. The coated proppant or the method of any one of paragraphs 1-30, wherein the treated aldehyde-based resin comprises about 0.1 wt % to about 1.5 wt % of the polyamine, based on a solids weight of the aldehyde-based resin.

32. The coated proppant or the method of any one of paragraphs 1-31, wherein the treated aldehyde-based resin comprises about 1 wt % to about 8 wt % of the polyamine, based on a solids weight of the aldehyde-based resin.

33. The coated proppant or the method of any one of paragraphs 1-32, wherein the coated proppant comprises about 0.5 wt % to about 10 wt % of the cured resin, based on a dry weight of the particles.

34. The coated proppant or the method of any one of paragraphs 1-33, wherein the coated proppant further comprises a cross-linker.

35. The coated proppant or the method of paragraph 34, wherein the coated proppant comprises about 0.1 wt % to about 2 wt % of the cross-linker, based on a dry weight of the particles.

36. The coated proppant or the method of paragraph 34, wherein the cross-linker comprises hexamethylenetetramine.

37. The coated proppant or the method of any one of paragraphs 1-36, wherein the aldehyde-based resin comprises a phenol-formaldehyde resin, a urea-formaldehyde resin, a melamine-formaldehyde resin, a resorcinol-formaldehyde resin, a melamine-urea-formaldehyde resin, a phenol-urea-formaldehyde resin, a phenol-melamine-formaldehyde resin, a phenol-resorcinol-formaldehyde resin, a copolymer thereof, or any mixture thereof.

38. The coated proppant or the method of any one of paragraphs 1-37, wherein the aldehyde-based resin comprises a phenol-formaldehyde novolac resin, a copolymer thereof, or a mixture thereof.

39. A method for treating a subterranean formation, comprising: introducing a fluid comprising the coated proppant of any one of paragraphs 1-38 into a wellbore.

40. A method for treating a subterranean formation, comprising: introducing a fluid comprising a plurality of coated proppants into a wellbore, wherein each coated proppant comprises: a particle; and a cured resin at least partially encasing the particle, wherein the cured resin comprises a reaction product of a treated aldehyde-based resin and a cross-linker, wherein the treated aldehyde-based resin comprises a reaction product of an aldehyde-based resin and a polyamine, wherein the polyamine comprises an aromatic polyamine, a poly($C_2$-$C_5$ alkylene) polyamine, or a mixture thereof, and wherein the coated proppants have a dry crush strength of about 0.1 wt % to about 3 wt % at a pressure of about 55.2 MPa, based on the Proppant Crush Resistance Test Procedure under ISO 13503-2:2011; and introducing the plurality of coated proppants into the subterranean formation via the wellbore.

41. A coated proppant, comprising: a particle; and a cured resin at least partially encasing the particle, wherein, prior to curing, the resin comprises a treated novolac resin comprising a phenol-formaldehyde novolac resin and a polyamine, wherein the polyamine comprises an aromatic polyamine, a poly($C_2$-$C_5$ alkylene) polyamine, or a mixture thereof, and wherein the coated proppant has a dry crush strength of about 0.1 wt % to about 3 wt % at a pressure of about 55.2 MPa, based on the Proppant Crush Resistance Test Procedure under ISO 13503-2:2011.

42. A method for making a coated proppant, comprising: reacting a phenol-formaldehyde novolac resin and a polyamine to produce a treated novolac resin, wherein the polyamine comprises an aromatic polyamine, a poly($C_2$-$C_5$ alkylene) polyamine, or a mixture thereof; and combining the treated novolac resin, a cross-linker, and a plurality of particles to produce a plurality of coated proppants having a cured resin, wherein the cured resin at least partially encases each of the particles, wherein the cured resin comprises a reaction product of the treated novolac resin and the cross-linker, and wherein the coated proppants have a dry crush strength of about 0.1 wt % to about 3 wt % at a pressure of about 55.2 MPa, based on the Proppant Crush Resistance Test Procedure under ISO 13503-2:2011.

43. A method for treating a subterranean formation, comprising: introducing a fluid comprising a plurality of coated proppants into a wellbore, wherein each coated proppant comprises: a particle; and a cured resin at least partially encasing the particle, wherein the cured resin comprises a reaction product of a treated novolac resin and a cross-linker, wherein the treated novolac resin comprises a reaction product of a phenol-formaldehyde novolac resin and a polyamine, wherein the polyamine comprises an aromatic polyamine, a poly($C_2$-$C_5$ alkylene) polyamine, or a mixture thereof, and wherein the coated proppants have a dry crush strength of about 0.1 wt % to about 3 wt % at a pressure of about 55.2 MPa, based on the Proppant Crush Resistance Test Procedure under ISO 13503-2:2011; and introducing the plurality of coated proppants into the subterranean formation via the wellbore.

44. The coated proppant or the method of any one of paragraphs 40-43, wherein the polyamine is combined or reacted with the phenol-formaldehyde novolac resin in an amount of about 0.05 wt % to about 10 wt %, based on a solids weight of the phenol-formaldehyde novolac resin, to produce the treated novolac resin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A coated proppant, comprising:
a particle; and
a cured resin at least partially encasing the particle, wherein, prior to curing, the resin comprises a treated aldehyde-based resin comprising a reaction product of a mixture comprising an aldehyde-based resin and about 0.1 wt % to about 1.5 wt % of a polyamine, based on a solids weight of the aldehyde-based resin, wherein the polyamine comprises an aromatic polyamine, a poly($C_2$-$C_5$ alkylene) polyamine, or a mixture thereof.

2. The coated proppant of claim 1, wherein the mixture comprises about 0.1 wt % to 1.5 wt % of the polyamine, based on a solids weight of the aldehyde-based resin.

3. The coated proppant of claim 1, wherein the mixture comprises about 0.1 wt % to 1 wt % of the polyamine, based on a solids weight of the aldehyde-based resin.

4. The coated proppant of claim 1, wherein the coated proppant comprises about 0.5 wt % to about 10 wt % of the cured resin, based on a dry weight of the particle.

5. The coated proppant of claim 1, wherein the polyamine comprises an aromatic diamine, an aromatic triamine, a poly($C_2$-$C_5$ alkaline) polyamine comprising a dialkylenetriamine, a poly($C_2$-$C_5$ alkylene) polyamine comprising a trialkylenetetramine, or any mixture thereof.

6. The coated proppant of claim 1, wherein the polyamine comprises the aromatic polyamine, and wherein the aromatic polyamine comprises 1,3-diaminobenzene, 1,4-diaminobenzene, 1,3-xylylenediamine, 1,4-xylylenediamine, 3,4'-diaminodiphenyl ether, 4,4'-diaminodiphenyl ether, an isomer thereof, a salt thereof, a complex thereof, an adduct thereof, or any mixture thereof.

7. The coated proppant of claim 1, wherein the polyamine comprises the poly($C_2$-$C_5$ alkylene) polyamine, and wherein the poly($C_2$-$C_5$ alkylene) polyamine comprises diethylenetriamine, dipropylenetriamine, dibutylenetriamine, an isomer thereof, a salt thereof, a complex thereof, an adduct thereof, or any mixture thereof.

8. The coated proppant of claim 1, wherein the aldehyde-based resin comprises a phenol-formaldehyde resin, a urea-formaldehyde resin, a melamine-formaldehyde resin, a resorcinol-formaldehyde resin, a melamine-urea-formaldehyde resin, a phenol-urea-formaldehyde resin, a phenol-melamine-formaldehyde resin, a phenol-resorcinol-formaldehyde resin, a copolymer thereof, or any mixture thereof.

9. The coated proppant of claim 1, wherein the aldehyde-based resin comprises a phenol-formaldehyde novolac resin, a copolymer thereof, or a mixture thereof.

10. The coated proppant of claim 1, wherein the cured resin completely encases the particle, and wherein the coated proppant has a dry crush strength of about 0.1 wt % to about 3 wt % at a pressure of about 55.2 MPa, based on the Proppant Crush Resistance Test Procedure under ISO 13503-2:2011.

11. The coated proppant of claim 1, wherein, prior to curing, the resin further comprises about 0.1 wt % to about 2 wt % of a cross-linker, based on a dry weight of the particle, and wherein the cross-linker comprises hexamethylenetetramine.

12. The coated proppant of claim 1, wherein particle comprises sand, and wherein the coated proppant has an average particle size of about 180 μm to about 2 mm.

13. A method for making a coated proppant according to claim 1, comprising:
reacting a mixture comprising an aldehyde-based resin and about 0.1 wt % to about 1.5 wt % of a polyamine to produce a treated aldehyde-based resin, wherein the polyamine comprises an aromatic polyamine, a poly(C$_2$-C$_5$ alkylene) polyamine, or a mixture thereof;
at least partially coating a plurality of particles with the treated aldehyde-based resin and a cross-linker; and
reacting the treated aldehyde-based resin and the cross-linker to produce a cured resin, wherein the cured resin at least partially encases each of the plurality of particles to produce coated proppants.

14. The method of claim 13, wherein reacting the aldehyde-based resin and the polyamine comprises:
combining formaldehyde and phenol to produce a first mixture;
heating the first mixture to produce the aldehyde-based resin;
combining the polyamine and the aldehyde-based resin to produce a second mixture; and
heating the second mixture to produce the treated aldehyde-based resin.

15. The method of claim 13, wherein reacting the aldehyde-based resin and the polyamine comprises:
heating the aldehyde-based resin having a solid state to produce a molten aldehyde-based resin;
adding the polyamine to the molten aldehyde-based resin to produce a molten mixture; and
heating the molten mixture to produce the treated aldehyde-based resin.

16. The method of claim 13, wherein the mixture comprises about 0.1 wt % to 1 wt % of the polyamine, based on the solids weight of the aldehyde-based resin, wherein the treated aldehyde-based resin is combined with the cross-linker and the plurality of particles in an amount of about 0.5 wt % to about 10 wt %, based on a dry weight of the plurality of particles, and wherein the cross-linker is combined with the treated aldehyde-based resin and the plurality of particles in an amount of about 0.1 wt % to about 2 wt %, based on a dry weight of the plurality of particles.

17. A method for treating a subterranean formation, comprising:
introducing a fluid comprising a plurality of coated proppants according to claim 1 into a wellbore, wherein each coated proppant comprises:
a particle; and
a cured resin at least partially encasing the particle, wherein the cured resin comprises a reaction product of a treated aldehyde-based resin and a cross-linker, wherein the treated aldehyde-based resin comprises a reaction product of a mixture comprising an aldehyde-based resin and about 0.1 wt % to about 1.5 wt % of a polyamine, wherein the polyamine comprises an aromatic polyamine, a poly(C$_2$-C$_5$ alkylene) polyamine, or a mixture thereof; and
introducing the plurality of coated proppants into the subterranean formation via the wellbore.

18. The coated proppant of claim 1, wherein the polyamine comprises 1,4-diaminobenzene, diethylenetriamine, or a mixture thereof, and wherein the mixture comprises about 0.1 wt % to 1 wt % of the polyamine, based on a solids weight of the aldehyde-based resin.

19. The coated proppant of claim 1, wherein:
the mixture comprises about 0.1 wt % to 1 wt % of the polyamine, based on a solids weight of the aldehyde-based resin, and
prior to curing, the resin further comprises about 1 wt % to about 30 wt % of a cross-linker different from said polyamine, about 0.1 wt % to about 5 wt % of a dibasic ester, about 0.01 wt % to about 3 wt % of an aminosilane, about 0.1 wt % to about 5 wt % of a wax, and about 0.05 wt % to about 3 wt % of an organic acid, wherein all weight percent values are based on the solids weight of the aldehyde-based resin.

20. The coated proppant of claim 1, wherein:
the mixture comprises about 0.1 wt % to 1 wt % of the polyamine, based on a solids weight of the aldehyde-based resin,
the polyamine comprises 1,4-diaminobenzene, diethylenetriamine, or a mixture thereof,
prior to curing, the resin further comprises about 1 wt % to about 30 wt % of a cross-linker, about 0.1 wt % to about 5 wt % of a dibasic ester, about 0.01 wt % to about 3 wt % of an aminosilane, about 0.1 wt % to about 5 wt % of a wax, and about 0.05 wt % to about 3 wt % of an organic acid, wherein all weight percent values are based on the solids weight of the aldehyde-based resin, wherein:
the cross-linker comprises hexamethylenetetramine,
the dibasic ester comprises dimethyl glutarate, dimethyl adipate, dimethyl succinate, or a mixture thereof,
the aminosilane comprises 3-aminopropyltrimethoxysilane, 3-aminopropyltriethoxysilane, N-(beta-aminoethyl) gamma-aminopropyltrimethoxysilane, N-(beta-aminoethyl) gamma-aminopropyltriethoxysilane, 3-glycidoxypropyltrimethoxysilane, 3-glycidoxypropyltriethoxysilane, salts thereof, or a mixture thereof,
the wax comprises a paraffin wax, a polyethylene wax, N,N'-ethylenebis(stearamide) wax, a metallic stearate wax, or a mixture thereof, and
the organic acid comprises salicylic acid, benzoic acid, maleic acid, citric acid, succinic acid, oxalic acid, or a mixture thereof.

* * * * *